(12) United States Patent
Papp et al.

(10) Patent No.: US 9,966,645 B1
(45) Date of Patent: May 8, 2018

(54) SHARED USE OF A MOTOR VEHICLE ANTENNA BY AN E-CALL CONTROLLER

(71) Applicant: AUDI AG, Ingolstadt (DE)

(72) Inventors: Aurel Papp, Karlskron (DE); Andreas Pohl, Denkendorf (DE); Jürgen Spehl, Wettstetten (DE); Lars Reichardt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/121,210

(22) PCT Filed: Feb. 27, 2016

(86) PCT No.: PCT/EP2016/000342
§ 371 (c)(1),
(2) Date: Aug. 24, 2016

(87) PCT Pub. No.: WO2016/192822
PCT Pub. Date: Dec. 8, 2016

(30) Foreign Application Priority Data

Jun. 3, 2015 (DE) .......................... 10 2015 007 144

(51) Int. Cl.
*H01Q 1/24* (2006.01)
*H01Q 3/24* (2006.01)
(Continued)

(52) U.S. Cl.
CPC .............. *H01P 1/15* (2013.01); *G08G 1/205* (2013.01); *H01Q 3/24* (2013.01); *H04B 1/0064* (2013.01);
(Continued)

(58) Field of Classification Search
CPC .......... H01Q 1/243; H01Q 3/24; H01Q 21/28; H01Q 25/002; H01Q 9/0407; H01Q 9/46;
(Continued)

(56) References Cited

U.S. PATENT DOCUMENTS 4,433,344 A * 2/1984 Gradin ................. H04B 7/0811
343/876
4,873,530 A * 10/1989 Takeuchi ........... G07C 9/00309
343/711
(Continued)

FOREIGN PATENT DOCUMENTS

CN 102812734 A1 12/2012
CN 104508984 A1 4/2015
(Continued)

OTHER PUBLICATIONS

English Translation by WIPO of the International Preliminary Report on Patentability for International Patent Application No. PCT/EP2016/000342, dated Dec. 14, 2017, 6 pp.

(Continued)

*Primary Examiner* — Tho G Phan
(74) *Attorney, Agent, or Firm* — Staas & Halsey LLP

(57) ABSTRACT

A switching apparatus alternately connects a mobile radio module and an E-Call controller to an antenna/ The switching apparatus includes a first signal input, a second signal input, an antenna connection and a changeover device that changes between a first switching state and a second switching state, based on at least one switching signal. In the first switching state, only the first signal input is electrically connected to the antenna connection, and in the second switching state, only the second signal input is electrically connected to the antenna connection. To prevent a connected transmission devices from diagnosing decoupling from the antenna connection as a fault, in at least the second switching state the changeover device electrically connects the signal input that is decoupled from the antenna connection to a terminating device which emulates an antenna at the signal input that is connected to the terminating device.

17 Claims, 2 Drawing Sheets

(51) Int. Cl.
*H01P 1/15* (2006.01)
*H04B 1/00* (2006.01)
*H04L 29/08* (2006.01)
*G08G 1/00* (2006.01)
*H04L 12/40* (2006.01)

(52) U.S. Cl.
CPC ........ *H04L 12/40006* (2013.01); *H04L 67/12* (2013.01)

(58) Field of Classification Search
CPC .......... H01Q 1/24; H01Q 3/247; G08G 1/205; H01P 1/15; H04B 1/0064
See application file for complete search history.

(56) References Cited

U.S. PATENT DOCUMENTS

| | | | | |
|---|---|---|---|---|
| 7,151,482 | B2* | 12/2006 | Natsume | G01S 13/343 342/147 |
| 7,245,261 | B2* | 7/2007 | Zafar | H01Q 1/3275 343/700 MS |
| 7,567,169 | B2* | 7/2009 | Dickmann | G07C 5/008 340/436 |
| 9,549,061 | B2* | 1/2017 | Buch | H04M 3/42 |
| 2005/0231439 | A1 | 10/2005 | Suwa et al. | |
| 2016/0155335 | A1* | 6/2016 | Backof, II | G08G 1/20 701/516 |
| 2017/0171730 | A1* | 6/2017 | Tzirkel-Hancock | G08G 1/127 |

FOREIGN PATENT DOCUMENTS

| | | |
|---|---|---|
| DE | 10 2007 058 985 A1 | 6/2009 |
| DE | 10 2010 028 871 A1 | 1/2011 |
| DE | 10 2013 215 728 A1 | 10/2014 |
| DE | 102015007144.0 | 6/2015 |
| WO | 2009/071490 A1 | 6/2009 |
| WO | 2014/015933 A1 | 1/2014 |
| WO | PCT/EP2016/000342 | 2/2016 |

OTHER PUBLICATIONS

German Office Action for Application No. 102015 007144.0 dated Oct. 9, 2015.
International Search Report for PCT/EP2016/000342 dated Jun. 3, 2016.
Office Action for Chinese Application No. 201680001678.9 dated Feb. 8, 2018, 5 pp.

\* cited by examiner

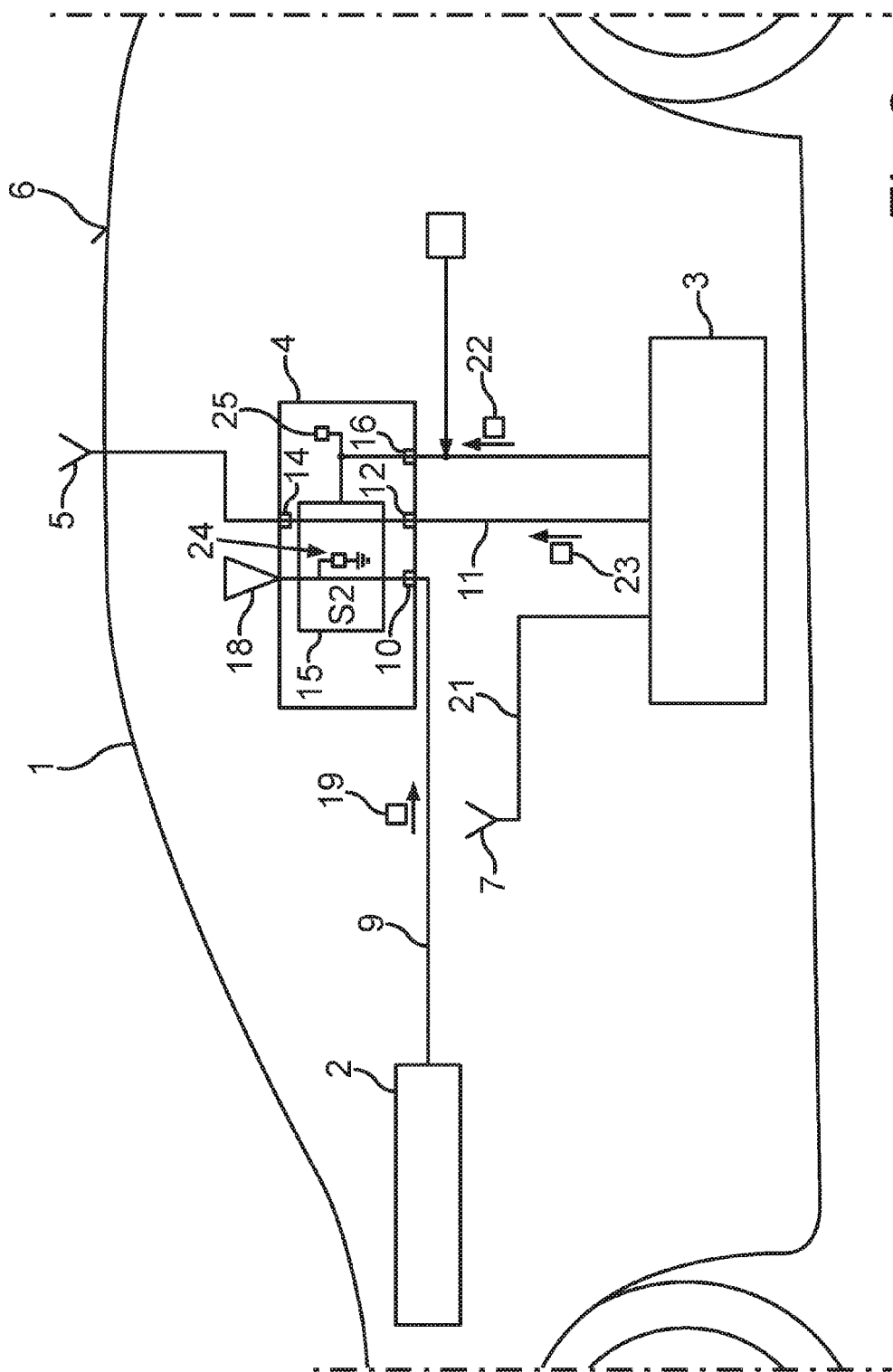

SHARED USE OF A MOTOR VEHICLE ANTENNA BY AN E-CALL CONTROLLER

CROSS REFERENCE TO RELATED APPLICATIONS

This application is the U.S. national stage of International Application No. PCT/EP2016/000342, filed Feb. 27, 2016 and claims the benefit thereof. The International Application claims the benefits of German Application No. 102015007144.0 filed on Jun. 3, 2015, both applications are incorporated by reference herein in their entirety.

BACKGROUND

Described below is a switching apparatus for alternately connecting a mobile radio module and an E-Call controller to a shared antenna. As a result, the antenna can be used by the mobile radio module and coupled to the E-Call controller if required.

An E-Call controller can be used to send an emergency call (or E-Call for short). The E-Call controller triggers this emergency call automatically if the motor vehicle is involved in an accident. The E-Call controller can be activated e.g. by a trigger signal from a crash sensor system. The emergency call can be used to transmit e.g. information about the current position of the motor vehicle to a control center. Furthermore, a telephone connection can be provided between the control center and the passenger compartment of the motor vehicle. This allows a person who is in the motor vehicle to communicate with the control center without having to operate the telephone himself.

Provision of a mobile radio connection, which is required for the emergency call, between motor vehicle and e.g. the control center requires an antenna that can be used to send the emergency call to a telephone network. Since an E-Call is a safety application, it is of interest to allow a mobile radio connection that is as robust and has as little interference as possible. A demand on the antenna is therefore that it be positioned so as to be as accident-proof as possible with the best possible performance. In this regard, there are only a few antenna positions that fulfill this as such. One possible position that ensures a good compromise solution between safety in the event of a crash and the best possible performance is the roof antenna. This is also very advantageous for use by a mobile radio module for telephone and online services, however. If this optimized position and antenna were to be used exclusively for an E-Call controller, this would inevitably mean impairment of the other services, that is to say telephone and online services, since it would be necessary to resort to other antennas for these. Interconnection by a simple coupler or switch is not readily possible at this location, since the inadequate decoupling means that there is the risk of the input stages of the two reception modules (mobile radio module and E-Call controller) damaging one another.

DE 10 2007 058 985 A1 discloses a motor vehicle in which an antenna is alternately connected by a switch to a mobile radio telephone, on the one hand, and an entry control system for keyless entry to the motor vehicle, on the other hand. If the entry control system uses the antenna, the mobile radio telephone is electrically isolated from the antenna by the switch, so that a coaxial cable that connects the mobile radio telephone and the switch ends in an open-ended line. Before the mobile radio telephone is isolated from the antenna, it is made certain that there is nobody in the motor vehicle, so that operation of the mobile radio telephone is unlikely.

The open-ended line results in the problem that, from the point of view of the mobile radio module, the connection between mobile radio module and antenna is interrupted, as may also be the case if the coaxial cable is faulty. In other words, from the point of view of the mobile radio module, decoupling of the coaxial cable from the antenna produces a connection fault.

DE 10 2010 028 871 A1 discloses an antenna device for vehicle communication. The antenna device has the E-Call unit or emergency call unit integrated in the mobile radio module, so that it is unnecessary for mobile radio module and E-Call controller to be coordinated, as a result.

DE 10 2013 215 728 A1 discloses a method for selecting a radio transmission channel in a radio system. Each radio transmission channel has a different transmission technology. Selection of the radio transmission channel optimizes the respective connection technology and/or infrastructure component in terms of the respective application and hence the quality. For an emergency call function, it is possible for a particularly high priority to be set, so that the emergency call function always provides the transmission technology having the highest quality.

US 2005/0231439 A1 describes an antenna switching device that can be used to route radio-frequency signals via a respective signal input to an antenna alternately. The other signal, which is not routed to the antenna, in each case is channeled off to a ground potential via a resonant circuit. This prevents this blocked signal, which is not forwarded to the antenna, from interfering with the other signal.

SUMMARY

Described below is a way of ensuring interference-free operation of a mobile radio module and an E-Call controller on a shared antenna in a motor vehicle.

Also described below is a switching apparatus that is designed to alternately connect the mobile radio module and the E-Call controller to the antenna. By way of example, the mobile radio module may be part of an information/entertainment system (infotainment system) and be provided for the purpose of providing telephone connections and/or online services during accident-free operation of the motor vehicle. The E-Call controller may be embodied in a manner that is known per se and designed to automatically send an emergency call in the event of the motor vehicle being involved in an accident or crash and/or to set up a voice connection between a passenger compartment of the motor vehicle and an emergency center or control center.

The switching apparatus connects both the mobile radio module and the E-Call controller to the antenna. To this end, the switching apparatus has a first signal input for receiving a transmission signal from the mobile radio module and a second signal input for receiving a transmission signal from the E-Call controller. An antenna connection is provided for the purpose of connecting the antenna. The switching apparatus has a changeover device that is designed to take a switching signal or to take multiple different switching signals as a basis for changing between a first and a second switching state in each case. By way of example, multiple switching signals materialize by virtue of the change between the switching states being performed on the basis of different switching signals, with one switching signal being able to be produced by the mobile radio module and another switching signal being able to be produced by the E-Call controller, for example. Further possible switching signals are also described.

In the first switching state, the first signal input (mobile radio module) is electrically connected to the antenna connection, and in the second switching state, the second signal input (E-Call controller) is electrically connected to the antenna connection. The changeover device thus electrically connects only one of the signal inputs to the antenna connection in each case. The other switching input is electrically decoupled from the antenna connection in the two switching states. In other words, there is no provision for specific signal transmission from the decoupled switching input to the antenna connection. Connected transmission devices are not intended to diagnose the decoupling from the antenna connection as a fault, however.

During a driving mode of the motor vehicle, it can be assumed that the first switching state is set, in which the mobile radio module is coupled to the antenna via the first signal input. In the first switching state, the E-Call controller therefore needs to be able to check whether the antenna is available to the E-Call controller in an emergency in the event of a crash. It is therefore necessary to be able to distinguish between the first switching state and e.g. a snapped-off cable. To this end, the switching apparatus has provision for, at least in the second switching state or else in both switching states, in each case, the changeover device to electrically connect that signal input that is decoupled from the antenna connection to a terminating device. This terminating device is designed to electrically emulate an antenna at the signal input that is connected to the terminating device. In other words, the signal input acts, electrically, as an antenna on account of the terminating device that is electrically connected to the signal input. To this end, the terminating device may be embodied as a circuit having a resonant circuit or having an antenna impedance, for example, so that the terminating device acts, electrically, toward the signal input as an antenna that is electrically connected to the signal input. In particular, the terminating device has, with respect to a signal ground line, an impedance that has an absolute value that is less than one thousand ohms. The terminating device may be embodied as a terminating resistor.

The switching apparatus affords the advantage that the E-Call controller remains capable of diagnosis insofar as it can monitor the electrical connection between E-Call controller and the second signal input electrically insofar as it is possible for a snapped-off cable or contact corrosion to be diagnosed or detected or identified. In particular, such a fault situation can be distinguished from the envisaged or intended first switching state in which the second signal input is electrically decoupled from the antenna connection. This is a nonhazardous or uncritical state, since the E-Call controller can be electrically connected to the antenna connection at any time by a switching signal (second switching state).

The switching apparatus can be provided as a separate connecting module that can be used to connect up the mobile radio module, the E-Call controller and the antenna. The switching apparatus can also be provided together with the antenna as an antenna module, for example. The switching apparatus may also be integrated in the E-Call controller, for example.

One of the electrical connections may be a DC or capacitive or inductive coupling of the respective signal input to the antenna connection or the terminating device. The choice can in this case be made by a person skilled in the art on the basis of the signal transmission technology used.

A buffer device is provided and designed to follow the change to the second switching state (E-Call controller connected to the antenna) by retaining this second switching state for a predetermined minimum period. By way of example, the minimum period may be in a range between 30 minutes and 120 minutes. Provision may also be made for the second switching state to be retained continuously or permanently. By way of example, the buffer device can be activated by a switching signal that triggers the change to the second switching state, and then automatically maintain the second switching state. To this end, the buffer device may be implemented as a program module of a microcontroller or microprocessor of the switching apparatus or as an integrated circuit or as a circuit formed of discrete components, for example. The buffer device advantageously results in the possibility of a telephone connection that is automatically set up by the E-Call controller being maintained and, as a result, a query option via the telephone connection being ensured from outside the motor vehicle. By way of example, it is thus possible for a person in the motor vehicle to be spoken to and/or interviewed via the telephone connection by taff in a control center.

According to one development, the switching apparatus has a protective circuit provided that is designed to absorb transmission power of that signal that is received via the signal input that is decoupled from the antenna connection. To this end, the protective circuit can convert the power that is to be absorbed into heat energy, for example. The transmission power is thus compensated for or channeled off, so that crosstalk or coupling of the transmission power into the antenna connection or the other signal input is avoided or at least reduced. In particular, there is provision for the protective circuit to absorb more than 50%, such as more than 70%, more than 85%, or even more than 90%, of the total transmission power of the transmission signal, that is to say particularly to convert it into heat energy. This means that unscheduled sending of the transmission signal via the decoupled signal input does not cause any damage to the antenna or the other signal input.

According to one development, the changeover device is designed, in the event of transmission of the at least one switching signal being subjected to interference, to automatically switch to the second switching state. The second switching state is thus a default switching state. In this regard, there is provision for the changeover device to be designed, if the at least one switching signal satisfies a predetermined interference criterion, to switch to the second switching state irrespective of the at least one switching signal. By way of example, the interference criterion can signify that the switching signal has a signal level that is not envisaged for fault-free operation. By way of example, in the event of a transmission line having been destroyed after a crash, e.g. as a result of a cable breakage, a transmission of a switching signal may be interrupted or blocked. This can then be automatically identified by the switching apparatus on the basis of an appropriate interference criterion. In this case, according to the development, the second switching state can then be automatically set by the switching apparatus. The development results in the advantage that after a crash, even in the event of signal lines being destroyed, the E-Call controller is nevertheless electrically coupled or connected to the antenna by the switching apparatus.

According to one development, the changeover device is designed to take a trigger signal from a crash sensor as a basis for changing to the second switching state. By way of example, the crash sensor may be provided in the motor vehicle for the purpose of triggering an airbag too. As a result of the trigger signal from a crash sensor being used to switch to the second switching state, there is advantageously an electrical connection available between the E-Call controller and the antenna following the crash. It is therefore possible for the emergency call to be sent without delay. In addition, the change to the second switching state takes place during the crash, so that, in the event of a signal line being destroyed by the crash, there is subsequently no longer any need for signal transmission of a switching signal in order to change to the second switching state.

In order to receive the trigger signal from a crash sensor, the switching apparatus can have a third signal input or control input that is different than the first and second signal inputs. Additionally or alternatively, there is provision for the changeover device to be designed to receive at least one switching signal via the second signal input. In other words, at least one switching signal is implicitly transmitted via the same electrical lines as are also used for transmitting the transmission signal from the E-Call controller. This interconnection has particularly low complexity.

In this case, there may be provision for the changeover device to be designed to receive a predetermined control sequence as a switching signal via the second switching input. In other words, the transmission signal from the E-Call controller that is used to signal the telephone connection or the emergency call is different than the control sequence for changing between the switching states. In particular, a control sequence is provided that switches the changeover device to the second switching state. Provision of a control sequence results in the advantage that an interference signal or random signal can be distinguished from the predetermined control sequence. This avoids a false alarm or erroneous changeover between the switching states.

According to one development, the changeover device is designed to switch to the second switching state if a signal power that is received via the second signal input is greater than a predetermined threshold value. In other words, a switching signal is obtained by virtue of a signal power at the second signal input exceeding the threshold value. This results in the advantage that the E-Call controller simply needs to begin to send the transmission signal in order to send the emergency call and/or to set up a telephone connection. The switching device then identifies the rise in the signal power at the second signal input and subsequently switches to the second switching state, so that the second signal input is electrically connected to the antenna connection. In addition or as an alternative to evaluation of the signal power, it is possible to detect that an amplitude of the transmission signal is greater than a predetermined threshold value, in this case to change to the second switching state.

If the switch-on signal is received via a third signal input or as a control sequence via the second signal input, then further advantageous refinements are obtained on the basis of how the switching signals are embodied. According to one development, at least one switching signal is embodied as a modulated pulse train, with the changeover device identifying this modulated pulse train. The modulation can be provided as frequency modulation and/or as phase modulation. A modulated pulse train can be distinguished particularly reliably from noise or an interference signal. Additionally or alternatively, it is possible to change to the second switching state if an amplitude of the transmission signal is greater than a predetermined threshold value. According to another development, at least one switching signal is received as an analog signal and changed over between the switching states on the basis of a threshold value detection. The threshold value detection can provide a binary decision threshold (dual-value decision) or multistage decision threshold (more than two decision states). A threshold value detection for an analog signal results in the advantage that it is also possible for a continuous signal, for example a sensor signal or state signal, to be used as a switching signal. A multistage decision threshold has the advantage that it is possible to distinguish between a switching signal for the first switching state and a switching signal for the second switching state and also a fault signal. This can define the interference criterion described, for example. One development has provision for at least one switching signal to be a pulse-width-modulated signal or a sequence of predetermined periodicity, each of which are identified by the changeover device. The sequence provided may be a square-wave or ramp-like sequence, for example. The sending of pulse-width-modulated signals or sequences having predetermined periodicity has the advantage that nonstop or permanent or continuous monitoring of the switching signal is possible. In other words, the switching state prescribed by the switching signal is retained for as long as the relevant pulse-width-modulated signal or the sequence is received and identified. Otherwise, it is possible to change over to a predetermined switching state, particularly the second switching state, as a fallback solution, for example. This results in the advantage that the fault or defect is identified immediately when the pulse-width-modulated signal or the sequence is interrupted. According to one development, at least one switching signal identified is a digitally modulated signal. This results in the advantage that a digitally encoded operating state or switching command is converted directly via the modulation into a signal that is evaluated as a switching signal by the changeover device. In particular, extensive information can be transmitted in digitally encoded form. By way of example, the switching state to be set can be selected. It is also possible, by way of example, for a prescribed period to be transmitted for which one of the switching states needs to be set in order subsequently to set the original switching state by the changeover device again.

In order to provide a suitable changeover device, one development provides for an RF relay (RF—radio frequency) or a semiconductor switch to be provided for the purpose of setting the two switching states. An RF relay or a semiconductor switch can be used to set up an electrical connection between one signal input and the antenna connection in each case and, in so doing, to electrically decouple the other signal input in a reliable manner. In other words, this attenuates or suppresses the crosstalk between the signal inputs.

The switching apparatus can provide a motor vehicle that can likewise afford the advantages. In the case of the motor vehicle, a mobile radio module and an E-Call controller are connected up to an antenna of the motor vehicle via a shared switching apparatus. In this case, the switching apparatus is an embodiment of the switching apparatus. The mobile radio module may be provided by an infotainment system of the motor vehicle. The E-Call controller may be embodied in a manner that is known per se. The E-Call controller may additionally be connected up to a second antenna or backup antenna. The motor vehicle is may be embodied as a motor car, particularly as an automobile.

BRIEF DESCRIPTION OF THE DRAWINGS

These and other aspects and advantages will become more apparent and more readily appreciated from the following description of an exemplary embodiment, taken in conjunction with the accompanying drawings of which:

FIG. 2 is a schematic block diagram, illustrated inside the motor vehicle, with the switching apparatus switched to a second switching state.

DETAILED DESCRIPTION OF THE PREFERRED EMBODIMENT

Figure 1:
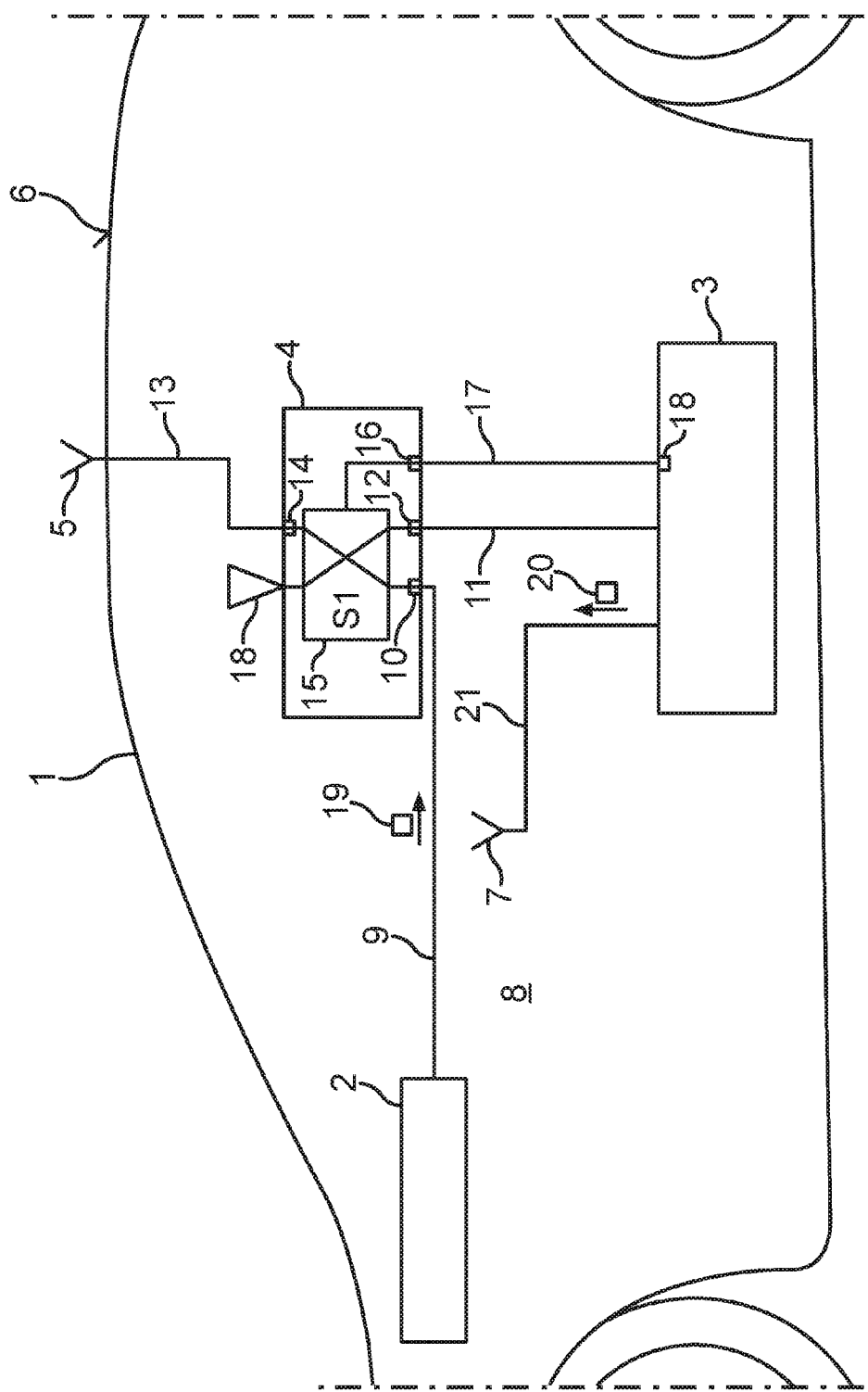
FIG. 1 is a schematic block diagram, illustrated inside a motor vehicle, of an embodiment of the switching apparatus that is switched to a first switching state.

Reference will now be made in detail to the preferred embodiments, examples of which are illustrated in the accompanying drawings, wherein like reference numerals refer to like elements throughout.

An exemplary embodiment explained below. In the case of the exemplary embodiment, the described components of the embodiment are each individual features that can be considered independently of one another and that each also develop independently of one another and hence can also be regarded as part of the invention individually or in a different combination than that shown. Furthermore, the embodiment described can also be augmented by other features than those already described.

In the figures, elements having the same function are each provided with the same reference symbols.

FIG. 1 shows a motor vehicle 1, which, by way of example, may be a motor car, particularly an automobile. It shows a mobile radio module 2, an E-Call controller 3, a switching apparatus 4, an antenna 5, which may be arranged on a vehicle roof 6 of the motor vehicle 1, and an antenna 7, which may be arranged in a vehicle interior 8 of the motor vehicle 1, for example. The antenna 7 may be integrated in a dashboard of the motor vehicle 1, for example. The mobile radio module 2 may be provided by an infotainment system, for example. The mobile radio module 2 may be a mobile telephone that can be used for telephoning by a user (not shown) of the motor vehicle 1. The mobile radio module 2 may also be embodied or provided as a modem for an Internet connection. The mobile radio module 2 may include a GSM module (GSM—global system for mobile telecommunications), a UMTS module (UMTS—universal mobile telecommunications system) or an LTE module (LTE—long term evolution), for example. The mobile radio module 2 may also include a WLAN technology (WLAN—wireless local area network).

The mobile radio module 2 may be connected to a first signal input 10 of the switching apparatus 4 via a first electrical signal line 9. The E-Call controller 3 may be connected to a second signal input 12 of the switching apparatus 4 via a second signal line 11. The switching apparatus 4 connects up the mobile radio module 2 and the E-Call controller 3 to the antenna 5. The antenna 5 is connected to an antenna connection 14 via an antenna line 13. The signal lines 9, 11 and/or the antenna line 13 may each be a coaxial line, for example.

The mobile radio module 2 and the E-Call controller 3 each connect only one of the devices to the antenna 5 at present. To this end, a changeover device 15 is provided in the switching apparatus 4, which alternately electrically connects or couples the first signal input 10 and the second signal input 12 to the antenna connection 14. The changeover device 15 may be implemented on the basis of an RF relay or semiconductor switch, for example. To change over the changeover device 15, a control input 16 may be provided, which the changeover device 15 can use to receive a switching signal. The switching signal is taken as a basis for setting one of two switching states S1, S2 for the changeover device 15. The control input 16 may be connected to a control output 18 of the E-Call controller 3 via a control line 17. As a result, the E-Call controller 3 can control or trigger or prompt changeover of the changeover device 15.

FIG. 1 shows the first switching state S1 of the changeover device 15, in which the first signal input 10 is electrically connected to the antenna connection 14. The second signal input 12 is decoupled from the antenna connection 14. Instead, the second signal input 12 is connected or coupled to a terminating device 18 by the changeover device 15. The terminating device 18 has an electrical behavior or an impedance such as an antenna, for example the antenna 5, may also have. In particular, the terminating device 18 is not an open-ended line. In other words, the terminating device 18 is an impedance of less than infinity or a ground connection.

During operation of the motor vehicle, the E-Call controller 3 can perform a diagnosis insofar as a check is performed to determine whether the signal line 11 is electrically connected to the second signal input 12. By way of example, a line resistance can be ascertained. This is possible because the terminating device 18 forms a terminating impedance that allows a distinction to be drawn, from the E-Call controller 3, between a faulty signal line 11, that is to say a signal line 11 that is detached from the second signal input 12 (open-ended line), on the one hand, and a signal line 11 that is connected up to the second signal input as intended. By way of example, the terminating device 18 may include a circuit having a resonant circuit and/or a nonreactive resistance. Since the terminating device 18 emulates an antenna, the E-Call controller 3 does not have to make a distinction between the first and second switching states of the changeover device in this case. In other words, there is no need for the E-Call controller 3 to be matched to the changeover device 15.

In the first switching state S1, the mobile radio module 2 can send a transmission signal 19 that is transmitted between the first signal input 10 and the antenna connection 14 via the switching apparatus 4 and sent to the antenna line 13 to the antenna 5. During this, the E-Call controller 3 can take the terminating device 18 as a basis for detecting or identifying or monitoring the electrical connection between the E-Call controller 3 and the second signal input 12, that is to say the intended electrical connection of the signal line 11. The E-Call controller 3 can use the second antenna 7 to likewise send a transmission signal 20. To this end, the second antenna 7 may be connected up to the E-Call controller 3 via a second antenna cable 21.

FIG. 2 shows a situation in which the changeover device 15 is switched to the second switching state S2. By way of example, the E-Call controller 3 may have produced a switching signal 22 at the control input 16. On the basis of the switching signal 22, the changeover device 15 has changed over from the first switching state S1 to the second switching state S2. By way of example, the switching signal 22 may be a level change. In other words, a signal amplitude of less than a predetermined threshold value on the control line 17 prompts the first switching state S1 to be set. For a signal level above the threshold value, the switching signal 22 is obtained, that is to say that the changeover device 15 changes to the switching state S2.

In the switching state S2, the first signal input 10 is connected to the terminating device 18 and the second signal input 12 is connected to the antenna connection 14. By way of example, the E-Call controller 3 may have produced the switching signal 22 on the basis of a crash by the motor vehicle 1. The E-Call controller 3 therefore attempts to send a transmission signal 23. By way of example, the transmission signal 23 may be an emergency signal and/or a signal for setting up or producing a mobile radio connection in order to provide a voice connection between the vehicle interior 8 and a vehicle-external control center.

In this case, the E-Call controller 3 first of all attempts to use that antenna having the better radiation characteristic. Among the two antennas 5, 7, this is the antenna 5. Therefore, the switching signal 22 is used by the E-Call controller 3 to bring about the second switching state S2 for the changeover device 15. The E-Call controller 3 can now send the transmission signal 23 to the second signal input 12 via the transmission line 11. The second signal input 12 is connected to the antenna connection 14, so that the transmission signal 23 is transmitted to the antenna 5.

During this, it may be that the mobile radio module 2 continues to send the transmission signal 19 because, during the crash, there was already a telephone connection provided via the mobile radio module 2. In order to absorb or compensate for the power of the transmission signal 19, the switching apparatus 4 may have a protective circuit 24. The protective circuit 24 converts the majority of the transmission power of the transmission signal 19 into heat energy. This prevents there being any crosstalk from the transmission signal 19 to the antenna 5 or to the E-Call controller 3. Furthermore, the two signal inputs 10, 12 may be decoupled from one another by further measures.

The switching apparatus 4 may furthermore have a buffer device 25 that may be provided by a microcontroller or an integrated circuit or a circuit, for example. The buffer device 25 can maintain the second switching state S2 for a predetermined minimum period. Instead of a buffer device 25, there may also be provision for the second switching state S2 to be maintained for the minimum period by the E-Call controller 3 by the switching signal 22.

The control input 16 may also be coupled to a crash sensor 26. The changeover device 15 can then take a trigger signal 27 from the crash sensor 26 as a basis for switching to the second switching state S2. The crash sensor 26 may be provided e.g. for the purpose of triggering an airbag unit (not shown).

The switching apparatus 4 therefore provides a module that allows the E-Call signal to be routed or conducted to a particular antenna, for example the roof antenna, in the event of a crash. So long as there is no accident, this antenna can be used by at least one other service or mobile radio module, for example a telephone service or an online service. The particular feature of the module provided is that the circuit in this module ensures particularly good isolation/decoupling of the two systems (mobile radio module 2 and E-Call controller 3). The E-Call controller 3 may furthermore provide for there to be automatic changeover to a second antenna 7 in the event of an E-Call not being able to be sent successfully via the antenna 5.

The switching apparatus can receive a switching signal from the E-Call controller. When this switching signal is output, the switching apparatus changes over the E-Call controller to the selected antenna, for example the roof antenna module. The switching apparatus is used to ensure that only one service at a time is present on the respective antenna and hence there is no risk of coupling among the services or of damage to the input modules or reception modules being able to occur by virtue of a transmission power from the other transmission module being applied to them. Nevertheless, a diagnosis option for each service is provided.

Since the diagnosis capability is provided by the terminating device 18, the correct electrical connection to the switching apparatus 4 can be checked by the respective controllers (E-Call controller 3 and mobile radio module 2) irrespective of the switching state of the changeover device 15. This prevents fault entries from being generated in a fault memory of the motor vehicle. Furthermore, when an E-Call is connected, it can be maintained independently for at least 60 minutes, for example. After the E-Call changeover pulse, that is to say the switching signal 22, the RF protective circuit 24 compensates for other controllers, that is to say that care is taken to ensure that the RF energy that continues to be emitted by other controllers does not lead to damage on the transmission module of the E-Call controller 3 or the RF front end, that is to say the switching apparatus 4 and/or the antenna 5, as a result of a mismatch or the missing antenna. Furthermore, the protective circuit can be used to prevent crosstalk between the two signal inputs of the switching apparatus 4.

By way of example, the technical implementation of the switching pulse of the switching signal 22 may be: frequency-modulated or phase-modulated pulse trains, square-wave or ramp-like sequences, particular periodicity, simple binary or multistage decision thresholds, through to digitally modulated bit sequences.

The switching apparatus can be used to reduce the number of antennas required in the motor vehicle. Furthermore, the high safety-relevant demands on an E-Call controller can be met and negative effects (worse antenna performance) for infotainment services can be avoided.

Overall, the example shows how the switching apparatus can provide an E-Call controlled circuit module.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A switching apparatus for alternately connecting a mobile radio module and an E-Call controller to an antenna, comprising:
   a first signal input configured to receive a first transmission signal from the mobile radio module;
   a second signal input configured to receive a second transmission signal from the E-Call controller;
   an antenna connection configured to connect to the antenna;
   a terminating device configured to electrically emulate the antenna at a third signal input of the terminating device;
   a changeover switch configured to change, based on at least one switching signal, between a first switching state of the first signal input electrically connected to the antenna connection and the second signal input electrically decoupled from the antenna connection, and a second switching state of the second signal input electrically connected to the antenna connection and the first signal input electrically decoupled from the antenna connection and connected by the changeover switch to the terminating device at the third signal input; and a buffer device configured to follow a change to the second switching state and to retain the second switching state at least for a predetermined minimum period.

2. The switching apparatus as claimed in claim 1, wherein in the first switching state the changeover switch is configured to electrically connect the second signal input to the third signal input of the terminating device.

3. The switching apparatus as claimed in claim 2, further comprising a protective circuit configured to absorb, in the first switching state and the second switching state, a transmission power of the second transmission signal and the first transmission signal, respectively.

4. The switching apparatus as claimed in claim 1, further comprising a protective circuit configured to absorb, in the second switching state, a transmission power of the first transmission signal received via the first signal input that is decoupled from the antenna connection.

5. The switching apparatus as claimed in claim 4, wherein the changeover switch is further configured to switch, when the at least one switching signal satisfies a predetermined interference criterion, to the second switching state irrespective of anything else indicated by the at least one switching signal.

6. The switching apparatus as claimed in claim 5, wherein the at least one switching signal includes a trigger signal from a crash sensor.

7. The switching apparatus as claimed in claim 6, wherein the changeover switch is further configured to receive the at least one switching signal via the second signal input.

8. The switching apparatus as claimed in claim 7, wherein the changeover switch is further configured to receive a predetermined control sequence in the at least one switching signal via the second signal input.

9. The switching apparatus as claimed in claim 8, wherein the changeover switch changes to the second switching state when at least one of a signal power received via the second signal input and an amplitude of the second transmission signal is greater than a respective threshold value.

10. The switching apparatus as claimed in claim 5, wherein the changeover switch is further configured to at least one of
identify a modulated pulse train, as the at least one switching signal,
receive an analog signal, as the at least one switching signal,
change, based on a threshold value detection, between the switching states,
identify at least one of a pulse-width-modulated signal and a sequence of predetermined periodicity, as the at least one switching signal, and
identify a digitally modulated signal, as the at least one switching signal.

11. The switching apparatus as claimed in claim 10, wherein the changeover switch includes at least one of an RF relay and a semiconductor switch setting one of the first and second switching states.

12. The switching apparatus as claimed in claim 7, wherein the changeover switch changes to the second switching state when at least one of a signal power received via the second signal input and an amplitude of the second transmission signal is greater than a respective threshold value.

13. The switching apparatus as claimed in claim 1, wherein the changeover switch is further configured to switch, when the at least one switching signal satisfies a predetermined interference criterion, to the second switching state irrespective of anything else indicated by the at least one switching signal.

14. The switching apparatus as claimed in claim 1, wherein the at least one switching signal includes a trigger signal from a crash sensor.

15. The switching apparatus as claimed in claim 1, wherein the changeover switch is further configured to receive the at least one switching signal via the second signal input.

16. The switching apparatus as claimed in claim 1, wherein the changeover switch is further configured to at least one of
identify a modulated pulse train as the at least one switching signal,
receive an analog signal as the at least one switching signal,
change between the switching states based on a threshold value detection,
identify at least one of a pulse-width-modulated signal and a sequence of predetermined periodicity, as the at least one switching signal, and
identify a digitally modulated signal as the at least one switching signal.

17. The switching apparatus as claimed in claim 1, wherein the changeover switch includes at least one of an RF relay and a semiconductor switch setting one of the first and second switching states.

* * * * *